(12) United States Patent
Ryan et al.

(10) Patent No.: US 10,501,139 B2
(45) Date of Patent: Dec. 10, 2019

(54) WHEELCHAIR ACCESSIBLE CYCLE

(71) Applicant: Ryan Flyer, LLC, Wichita, KS (US)

(72) Inventors: Dale Ryan, Wichita, KS (US); Kara Ryan, Wichita, KS (US); Ike Reynolds, Winfield, KS (US)

(73) Assignee: Ryan Flyer, Wichita, KS (US)

( * ) Notice: Subject to any disclaimer, the term of this patent is extended or adjusted under 35 U.S.C. 154(b) by 16 days.

(21) Appl. No.: 15/686,370

(22) Filed: Aug. 25, 2017

(65) Prior Publication Data

US 2018/0057096 A1 Mar. 1, 2018

Related U.S. Application Data

(60) Provisional application No. 62/379,418, filed on Aug. 25, 2016.

(51) Int. Cl.
| | |
|---|---|
| *B62K 5/003* | (2013.01) |
| *B62K 19/00* | (2006.01) |
| *B62K 17/00* | (2006.01) |
| *B62K 5/01* | (2013.01) |
| *B62K 5/025* | (2013.01) |
| *B62K 5/023* | (2013.01) |
| *B62K 21/00* | (2006.01) |
| *B62M 6/60* | (2010.01) |

(Continued)

(52) U.S. Cl.
CPC .............. *B62K 5/003* (2013.01); *B62K 5/007* (2013.01); *B62K 5/01* (2013.01); *B62K 5/023* (2013.01); *B62K 5/025* (2013.01); *B62K 5/08* (2013.01); *B62K 17/00* (2013.01); *B62K 19/00* (2013.01); *B62K 19/06* (2013.01); *B62K 21/00* (2013.01); *B62M 6/60* (2013.01)

(58) Field of Classification Search
CPC .......... B62K 5/003; B62K 5/007; B62K 5/01; B62K 5/023; B62K 5/025; B62K 5/08; B62K 17/00; B62K 19/00; B62K 19/06; B62K 21/00; B62M 6/60
USPC ......................................................... 280/261
See application file for complete search history.

(56) References Cited

U.S. PATENT DOCUMENTS 626,620 A * 6/1899 Lamar .................... A61G 5/023
                                                                                        280/211
3,025,985 A * 3/1962 Crawford .................. B60P 3/07
                                                                                        280/400

(Continued)

FOREIGN PATENT DOCUMENTS

GB               2379643 A * 3/2003 ............. A61G 5/045

*Primary Examiner* — Jacob D Knutson
(74) *Attorney, Agent, or Firm* — Young Basile Hanlon & MacFarlane, P.C.

(57) ABSTRACT

A wheelchair accessible cycle that can be driven on a surface and operated from a wheelchair. The wheelchair accessible cycle comprising a frame and a platform. The frame has a front portion with a first wheel and a rear portion with second and third wheels. The platform is disposed laterally between the second and the third wheels and longitudinally between the front and rear portions of the frame. The platform is configurable to transport the wheelchair and pivotally moveable between a tilted position, where a free edge of the platform is in contact with the surface for rollably receiving the wheelchair, and a horizontal position, where the platform is generally horizontal and the wheelchair is adjacent to the front portion of the frame when the wheelchair is loaded onto the platform.

21 Claims, 6 Drawing Sheets

(51) Int. Cl.
*B62K 5/007* (2013.01)
*B62K 5/08* (2006.01)
*B62K 19/06* (2006.01)

(56) References Cited

U.S. PATENT DOCUMENTS

| | | | | |
|---|---|---|---|---|
| 3,603,609 | A * | 9/1971 | Hott | B62D 61/08 |
| | | | | 180/210 |
| 3,659,871 | A * | 5/1972 | Hott | B62K 5/02 |
| | | | | 280/221 |
| 5,342,162 | A * | 8/1994 | Robinette | B60P 3/07 |
| | | | | 280/402 |
| 6,378,642 | B1 * | 4/2002 | Sutton | B62D 61/08 |
| | | | | 180/208 |
| 6,811,180 | B1 * | 11/2004 | Molliere | A01M 31/006 |
| | | | | 182/116 |
| 8,672,075 | B1 * | 3/2014 | Walker | B62K 5/08 |
| | | | | 180/206.1 |
| 2007/0018416 | A1 | 1/2007 | Escarguel | |
| 2008/0184502 | A1 * | 8/2008 | Roberts | A61G 3/061 |
| | | | | 14/71.1 |
| 2012/0175856 | A1 | 7/2012 | Ellis | |

\* cited by examiner

WHEELCHAIR ACCESSIBLE CYCLE

CROSS-REFERENCE TO RELATED APPLICATION

This application claims the benefit of U.S. Provisional Application Ser. No. 62/379,418, filed on Aug. 25, 2016, the entire disclosure of which is incorporated herein by reference.

TECHNICAL FIELD

This disclosure relates generally to cycles, and more particularly, to wheelchair accessible cycles having a tilting platform for loading and unloading a wheelchair into the cycle.

BACKGROUND

For an individual that uses a wheelchair, independent mobility can be a daily struggle. The individual can be dependent upon others or a properly equipped vehicle to experience the world around them. Simple transportation options, such as riding a bicycle, are typically not feasible or require the individual to transfer out of the wheelchair. Transporting a person in a wheelchair in an automobile or bus can even be more difficult, as electric lifts are typically required, or again, the person must transfer out of the wheelchair. It is therefore desirable to have a simple vehicle, such as a bicycle, that allows the individual to operate the vehicle without having to transfer out of the wheelchair.

SUMMARY

Disclosed herein is a wheelchair accessible cycle that can be driven on a surface and operated from a wheelchair. The wheelchair accessible cycle comprises a frame and a platform. The frame has a front portion with a first wheel and a rear portion with second and third wheels. The platform is disposed laterally between the second and the third wheels and longitudinally between the front and rear portions of the frame. The platform is configurable to transport the wheelchair and pivotally moveable between a tilted position, where a free edge of the platform is in contact with the surface for rollably receiving the wheelchair, and a horizontal position, where the platform is generally horizontal, and the wheelchair is adjacent to the front portion of the frame when the wheelchair is loaded onto the platform.

The platform can be vertically disposed between the surface and an axle of at least one of the second wheel or the third wheel. The platform can extend longitudinally beyond the rear portion of the frame. The platform can include two flanges that pivotally connect the platform to the frame.

The wheelchair accessible cycle can include a locking assembly connected to the frame and the platform. The locking assembly can move between a locked position, where the platform is retained in the horizontal position, and an unlocked position, where the platform can move between the tilted position and the horizontal position. The locking assembly can include a spring connected to the platform and that frame that biases the locking assembly into the locked position. The locking assembly can include a laterally extending bar for engaging the platform in the horizontal position. Ends of the laterally extending bar can be provided with extensions that extend substantially perpendicular from the laterally extending bar and connect the laterally extending bar to the frame. At least one of the extensions can provide a recess. The platform can include a flange with a knob that engages the recess to retain the platform in the horizontal position. The locking assembly can include a handle connected to at least one of the extensions of the laterally extending bar.

The platform can include a base and a front lip extending from the base longitudinally opposite the free edge of the base. The front lip of the platform can rest on the laterally extending bar of the locking assembly in the horizontal position. The platform can include a base, a first side wall extending substantially perpendicular from the base, a second side wall laterally opposite and substantially parallel to the first side wall, a first flange extending upward from the first side wall between the free edge and a second end of the platform longitudinally opposite the free edge, and a second flange extending upward from the second side wall between the free edge and the second end of the platform. The first and second flanges of the platform can pivotally connect the platform to the frame and can be substantially a same longitudinal distance from the second end of the platform. The first and second flanges of the platform can be closer to the second end of the platform than the free edge of the platform. At least one of the first side wall, the second side wall, or the base can be provided with apertures extending therethrough.

The frame can include a first framed enclosure extending vertically around the second wheel substantially perpendicular to an axle of the second wheel and a second framed enclosure extending vertically around the third wheel substantially perpendicular to an axle of the third wheel. The platform can include a base and a front lip extending at an obtuse angle from the base. The front lip of the platform can have a flat extension that is substantially parallel to the base of the platform. A strap can be attached to the front lip of the platform and extend laterally over a recess defined on one side by the flat extension. The wheelchair accessible cycle can include at least one of a pedal powertrain or an electric powertrain operably connected to at least one of the first wheel, the second wheel, or the third wheel. The wheelchair accessible cycle can include a steering mechanism operably connected to at least one of the first wheel, the second wheel, or the third wheel.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
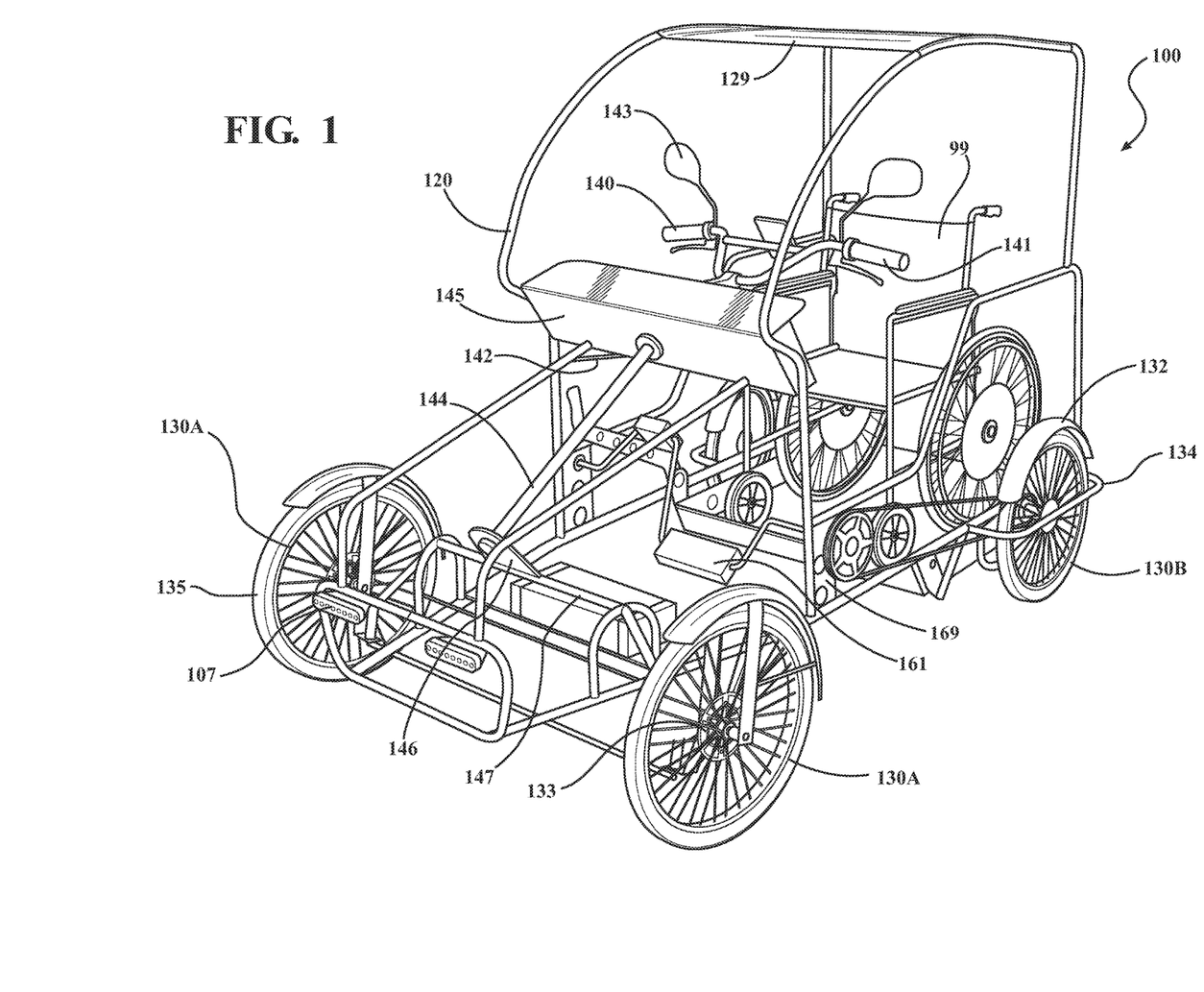
FIG. 1 is a perspective, front view of a wheelchair accessible cycle with a wheelchair loaded onto a tilting platform.
Figure 2:
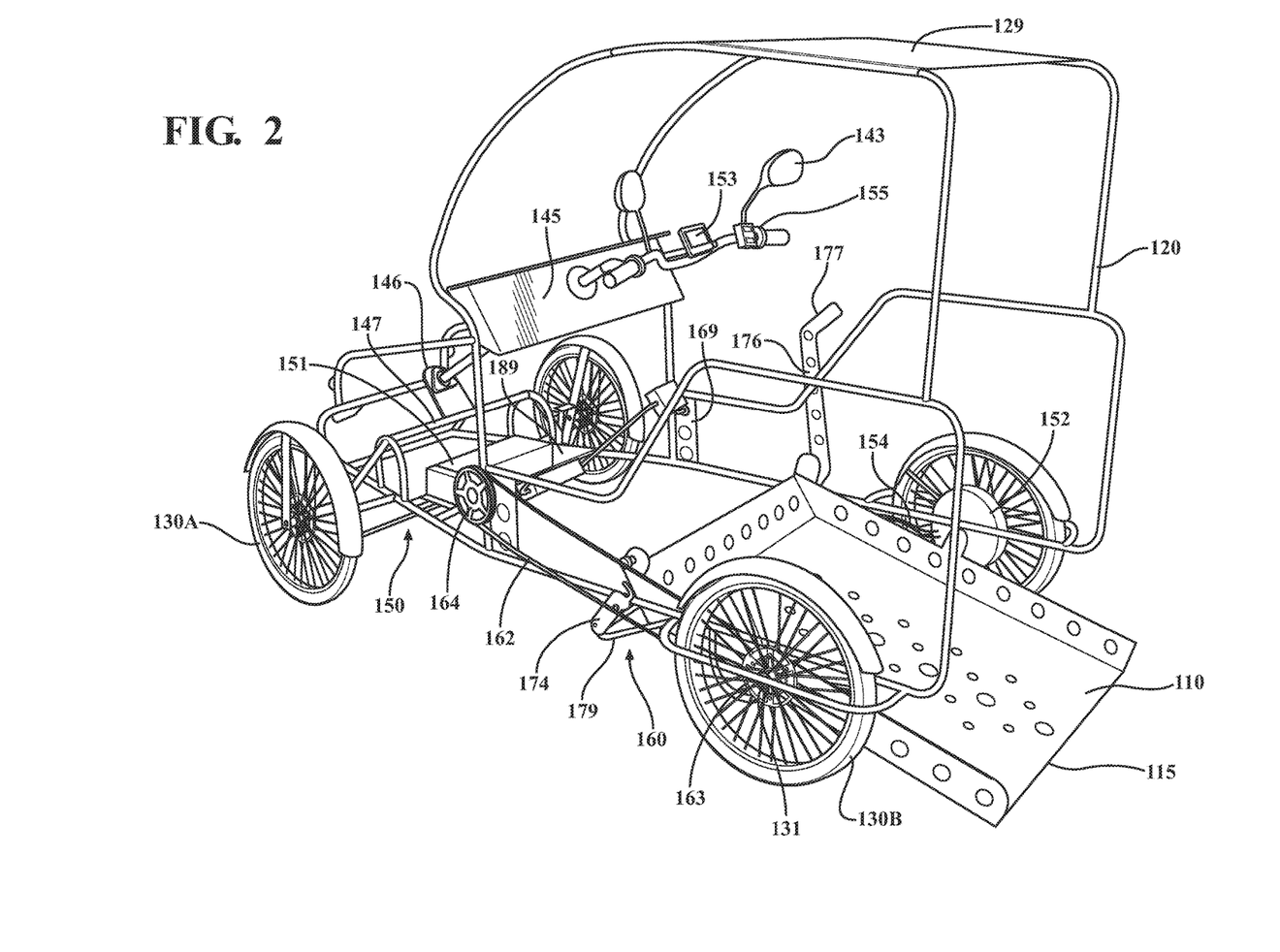
FIG. 2 is a perspective, rear view of the wheelchair accessible cycle with the tilting platform in a tilted position.

The disclosure herein is directed to a wheelchair accessible cycle 100 for carrying an individual or operator (not shown) seated in a wheelchair 99, as shown in FIGS. 1-2. The wheelchair accessible cycle 100 provides a tilting platform 110 that allows the individual using the wheelchair 99 to easily load onto the wheelchair accessible cycle 100 by his or herself. The tilting platform 110 can move between a tilted position, wherein the operator in the wheelchair 99 can wheel onto or off the tilting platform 110, and a horizontal position, wherein the operator can operate the wheelchair accessible cycle 100. The operator can operate the wheelchair accessible cycle 100 from the wheelchair 99 by engaging a pedal powertrain 160 and/or an electric powertrain 150. When the electric powertrain 150 is present with the pedal powertrain 160, the operator can use the pedal powertrain 160, the electric powertrain 150, or both to power the wheelchair accessible cycle 100. Once at a desired location, the tilting platform 110 allows the operator to easily unload from the wheelchair accessible cycle 100 by his or her self.

The wheelchair accessible cycle 100 includes a frame 120 that can be configured to resemble an open-air go-cart or automobile. The frame 120 can be made from a high-strength, light weight material, such as steel, aluminum, titanium, carbon fiber, or polymeric plastic, and may have any cross-sectional configuration. The illustrated, non-limiting example uses ¾ inch steel circular tubing that is bent and welded together to form the frame 120. Other configurations of the frame 120 are possible other than the frame 120 that will be described.

Figure 3:
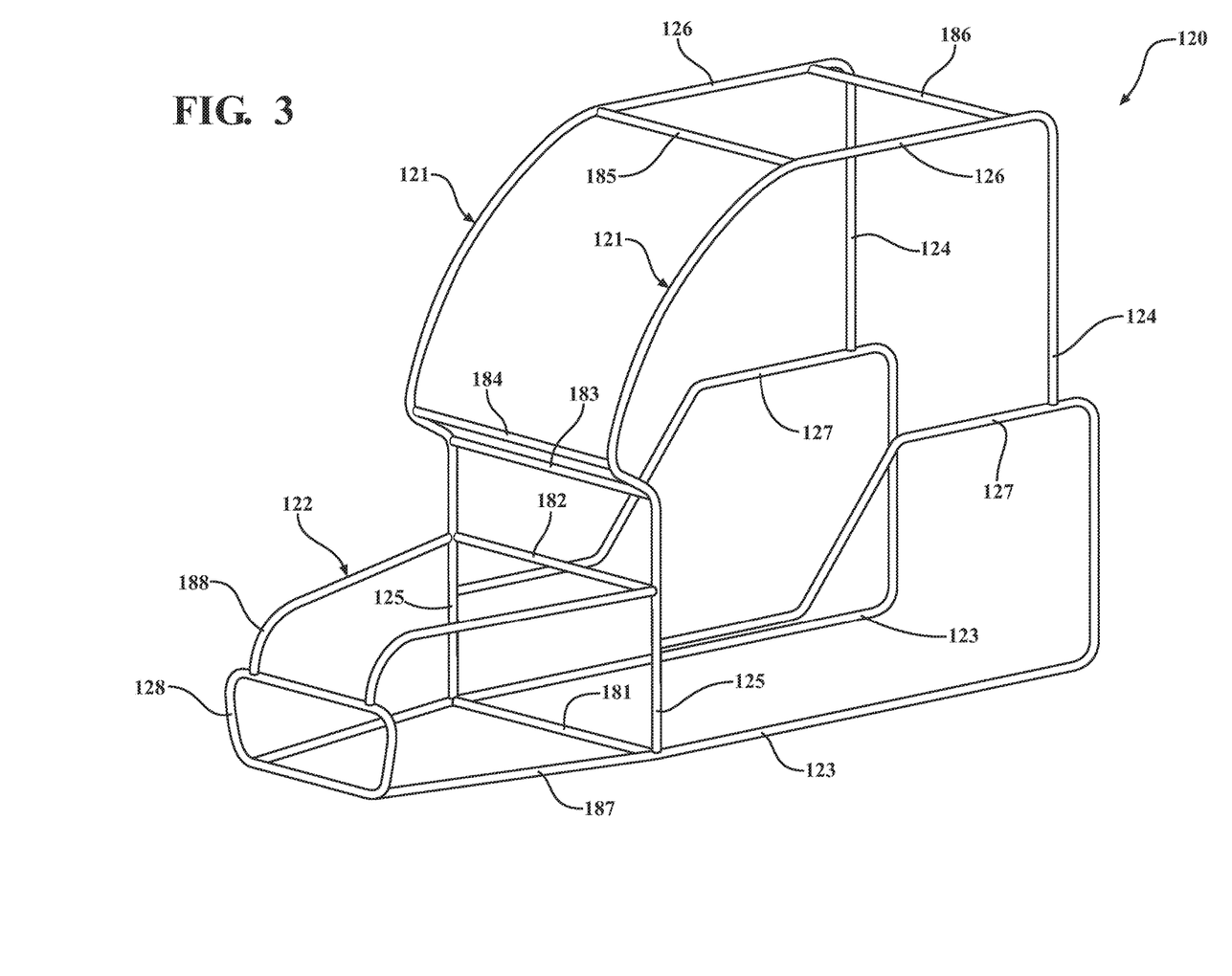
FIG. 3 is a perspective view of a frame for the wheelchair accessible cycle having the tilting platform for loading and unloading the wheelchair.

As illustrated in FIG. 3, the frame 120 can be comprised of a front nose section 122 and two substantially similar side panels 121 connected together by a plurality of supports 181, 182, 183, 184, 185, 186. The side panels 121 can each have a bottom member 123, a back member 124, a front member 125 that generally opposes the back member 124, and a top member 126 that generally opposes the bottom member 123. The top member 126 of each side panel 121 can be generally horizontal and bend to create an approximately 90-degree angle with the back member 124. Approximately half way between the top member 126 and the bottom member 123, the back member 124 can have a one-step configuration that extends away from the front member 125 such that the back member 124 bends to be generally parallel to the bottom member 123 for a short distance before bending back to be substantially perpendicular to the top member 126. The back member 124 of each side panel 121 can then continue toward the bottom member 123 where the back member 124 bends to create an approximately 90-degree angle with the bottom member 123.

After the bend, the bottom member 123 can continue toward the front member 125 in a manner that is substantially parallel to the horizontal portion of the top member 126. The front member 125 can be welded to the bottom member 123 and extend substantially perpendicular and upwardly away from the bottom member 123. After extending substantially parallel to the back member 124, the front member 125 can bend away from the back member 124 in a substantially "S" shaped configuration for a short distance before bending back toward the back member 124 in an arcuate configuration where the front member 125 can be welded to the top member 126.

To assist the operator in loading and unloading from the wheelchair accessible cycle 100, a mid-section member 127 can be welded to the substantially parallel portions of the front member 125 and the back member 124. The first one-third of the mid-section member 127 can extend substantially parallel to the bottom member 123 before angling upwards toward the top member 126 for approximately one-third of the mid-section member 127. The final one-third of the mid-section member 127 can return to extending substantially parallel to the bottom member 123 before connecting to the back member 124 where the back member 124 has the one-step configuration.

As previously mentioned, the side panels 121 can be connected to one another via the plurality of supports 181, 182, 183, 184, 185, 186. The ends of each support 181, 182, 183, 184, 185, 186 can be welded to corresponding locations on each of the side panels 121. The first support 181 can be welded to the location where the front member 125 is welded to the bottom member 123. The second support 182 can be welded to the front member 125 between the bottom member 123 and where the front member 125 bends away from the back member 124. The third support 183 can be welded to the front member 125 where the front member 125 bends away from the back member 124. The fourth support 184 can be welded to the front member 125 where the front member 125 returns back toward the back member 124. The fifth support 185 can be welded to the side panels 121 where the front member 125 and the top member 126 meet. The sixth support 186 can be welded to the top member 126 adjacent to where the top member 126 bends into the back member 124.

The front nose section 122 can be connected to the front member 125 and be comprised of a substantially trapezoid nose member 128, a pair of substantially similar bottom nose members 187, and a pair of substantially similar top nose members 188. The trapezoid nose member 128 can have a trapezoidal configuration with a top, a bottom, and two sides, wherein the top and the bottom are substantially parallel to one another, the two sides have substantially the same length and are connected to the top and bottom, and the top is longer than the bottom. One end of each of the bottom nose members 187 can be welded to the bottom of the trapezoid nose member 128, and the other end of each of the bottom nose members 187 can be welded to one of the side panels 121 where the bottom member 123 and the front member 125 are welded together. The bottom nose members 187 can extend inward toward one another as the bottom nose members 187 extend from the front member 125 to the trapezoid nose member 128. One end of each of the top nose members 188 can be welded to the bottom of the trapezoid nose member 128, and the other end of each of the top nose members 188 can be welded to one of the side panels 121 where the front member 125 is welded to the second support 182. An approximately 90-degree radial bend can be formed in each of the top nose members 188 adjacent to the trapezoid nose member 128.

The frame 120 can be elevated off the ground or a supporting surface by a plurality of wheels 130, as shown in FIGS. 1-2. In the illustrated, non-limiting example there are four spoked wheels 130A, 130B with two wheels 130A, 130B connected to each side panel 121 through conventional means, such as an axle 131 and/or a suspension system. Each wheel 130A, 130B also has a rubber tire 135 mounted thereon. It is anticipated that there could be more or less wheels 130, for example, but not limited to, a tricycle. As shown, the front wheels 130A are connected to the bottom nose members 187 between the trapezoid nose member 128 and the front member 125, and the rear wheels 130B are connected to the bottom member 123 near the back member 124. The illustrated example provides disc brakes 133 that are mounted to each of the front wheels 130A to allow the individual operating the wheelchair accessible cycle 100 to decrease its speed. Other braking systems, such as rim brakes, could be used. The wheels 130A, 130B can also be provided with fenders 132 to prevent mud, rocks, and the like from being thrown into the air by the wheels 130 as they rotate.

To steer the wheelchair accessible cycle 100, the front wheels 130A can be coupled with a steering mechanism, which may include handlebars or a steering wheel. In the illustrated, non-limiting example, the steering mechanism includes handlebars 140 that extend through a front side of a dashboard 145 mounted to the third support 183 and the fourth support 184 toward the back member 124 of the frame 120. On a back side of the dashboard 145, a steering column 144 connects the handlebars 140 to a flange 146 on an axle 147 shared by the front wheels 130A. As a result, movement of the handlebars 140 translates into movement of the flange 146 and ultimately moves the front wheels 130A right and left so that the wheelchair accessible cycle 100 can be directed in a desired direction by the operator.

Brake levers 141 can be provided on the steering mechanism, such as being connected to the handlebars 140, to activate the disc brakes 133 on the wheels 130. The brake levers 141 can be connected to the disc brakes 133 through the use of cables 142. The cables 142 can extend along and/or be secured to the frame 120. The cables 142 actuate the disc brakes 133 via the brake levers 141. It is anticipated that regenerative brakes could be used to reclaim power from braking to charge a battery 151, and hydraulic lines could be used instead of standard cable brakes.

The wheelchair accessible cycle 100 can be provided with safety and comfort enhancements. For example, the handlebars 140 may also have rear-view mirrors 143 attached thereto. Alternatively, the rear-view mirrors 143 could be attached to other components of the wheelchair accessible cycle 100, such as the frame 120. For the operator's comfort, a covering 129 can also be provided on the horizontal portion of the top member 126 of the frame 120. The covering 129 can be made from cloth or any suitable flexible or rigid material. Headlights 107 may also be connected to the longer base of the trapezoid nose member 128 to allow the wheelchair accessible cycle 100 to be driven in dark conditions. A switch (not shown) may be provided on the dashboard 145 for turning the headlights 107 on and off. The wheelchair accessible cycle 100 can also be provided with a parking brake, taillights, brake lights, turn signals, and/or a horn to provide additional safety measures for the operator.

The rear wheels 130B can be coupled with the electric powertrain 150 and the pedal powertrain 160, which results in rear-wheel drive. It is anticipated that the electric powertrain 150 and/or the pedal powertrain 160 could be coupled with the front wheels 130A, which would result in front-wheel drive. For added stability, the frame 120 can partially enclose or loop around the drive wheels, in this example the rear wheels 130B. As illustrated, a framed enclosure 134 extends substantially perpendicular from the bottom member 123 of each side panel 121. The framed enclosure 134 is substantially perpendicular to the axle 131 of each rear wheel 130B and sized accordingly so that the enclosed wheel 130 can freely rotate without interference.

The pedal powertrain 160 can include two pedal cranks 161, a chain 162, a sprocket 163, and a chain ring 164. As illustrated, the pedal cranks 161 are rotatably connected to the frame 120 via two substantially similar plates 169 welded to the side panels 121 on the front member 125 between the bottom member 123 and the mid-section member 127. This position allows the operator of the wheelchair accessible cycle 100 to rotate the pedals cranks 161 from the wheelchair 99 with his or her feet in a manner that is similar to that of a recumbent bicycle. The chain ring 164 is also attached to the plates 169 and coupled with the pedal cranks 161 such that rotation of the pedal cranks 161 rotates the chain ring 164. The sprocket 163 is attached to the axle 131 of one of the rear wheels 130B. The chain 162 encircles and engages both the chain ring 164 and the sprocket 163 such that rotation of the chain ring 164 rotates the sprocket 163. Because the sprocket 163 is coupled with one of the rear wheels 130B, rotation of the sprocket 163 rotates the rear wheel 130B. To assist with operation, the height of the pedal cranks 161 can be adjustable. A single low gear sprocket can also be used to make the pedal powertrain 160 easier to operate. Alternatively, multiple sprockets can be used with gear shifters (not shown) to provide multiple gears.

If the operator does not wish to or is unable to exclusively use the pedal powertrain 160, the electric powertrain 150 can be engaged to power or assist in powering the wheelchair accessible cycle 100. The electric powertrain 150 can include the battery 151, an electric hub motor 152, and a controller 153. The battery 151 can be rechargeable. As illustrated, the battery 151 is attached to a cross support 189 on the frame 120 near the front wheels 130A, and the electric hub motor 152 is attached to the rear wheel 130B that is not connected to the sprocket 163 of the pedal powertrain 160. It is anticipated, however, that the battery 151 could be located elsewhere on the wheelchair accessible cycle 100 or that the electric hub motor 152 could be attached to a different wheel. Alternatively, a traditional electric motor that is belt or chain driven could be used in place of the electric hub motor 152.

The battery 151 can be connected to the electric hub motor 152 through the use of wires 154 that extend along the frame 120. Wires 154 can also be used to connect the electric hub motor 152 to the controller 153, which is attached to the handlebars 140 in the non-limiting example. The wires 154 can also connect the controller 153 to a throttle 155 on the handlebars 140. In the illustrated example, a throttle boss is used to allow the operator to slightly relax his or her grip. However, other throttles could be used, such as a thumb throttle. The controller 153 gives the operator the option to drive the wheelchair accessible cycle 100 forward and backwards by changing the direction the rear wheels 130B are rotated by the electric powertrain 150. The controller 153 can also include a cruise control option to keep the wheelchair accessible cycle 100 moving at a constant speed.

Figure 4:
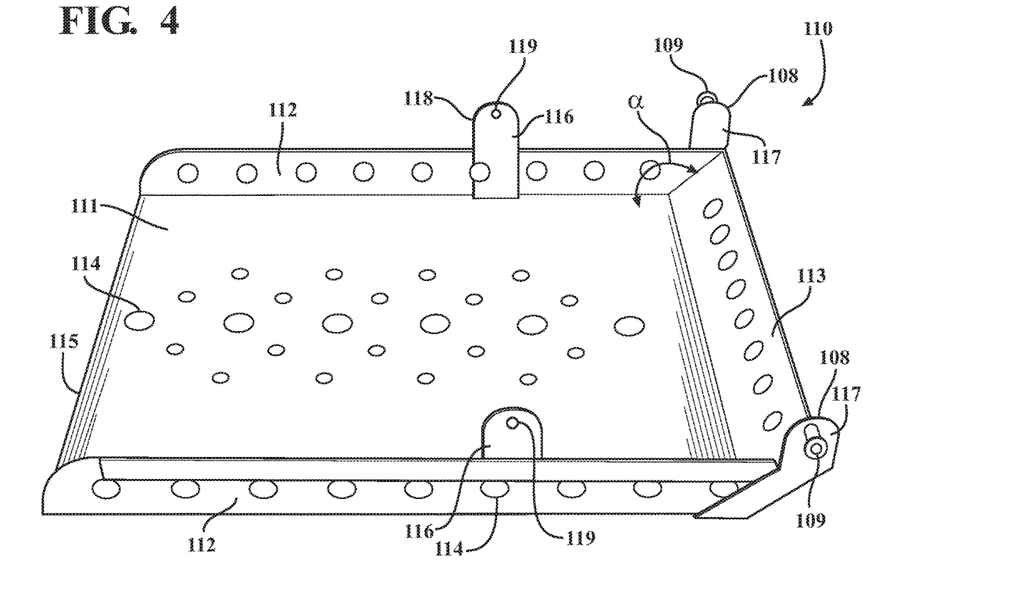
FIG. 4 is a perspective view of the tilting platform.

The tilting platform 110 allows the individual using the wheelchair 99 to easily load onto and unload from the wheelchair accessible cycle 100 by his or herself. As shown in FIG. 4, the tilting platform 110 can have a base 111 with a square or rectangular configuration. The base 111 is sized to accommodate and support the wheelchair 99. The base 111 can have two substantially similar side walls 112 and a front lip 113. As illustrated, the front lip 113 forms an obtuse angle α with the base 111 and is opposite a free end 115 of the base 111. The side walls 112 can be substantially parallel to one another and substantially perpendicular to the base 111. The tilting platform 110 can be made of a high strength, light weight material, such as steel, titanium, aluminum, or polymeric plastic. To help reduce the weight of the tilting platform 110 and the overall weight of the wheelchair accessible cycle 100, apertures 114 can be formed in the side walls 112, the front lip 113, and/or the base 111 of the tilting platform 110.

To allow suspension of the tilting platform 110 from the frame 120, the tilting platform 110 can provide two pairs of flanges 116, 117. The first pair of flanges 116 can be connected to the side walls 112 between the free end 115 and the front lip 113 of the base 111 and extend away from the base 111. In the illustrated, non-limiting example, the flanges 116 are closer to the front lip 113 than the free end 115 of the tilting platform 110. A free end 118 of each flange 116 can have an arcuate configuration with an aperture 119 extending therethrough. The aperture 119 can be used for attaching the tilting platform 110 to the bottom member 123 of the frame 120 between the front wheels 130A and the rear wheels 130B through the use of a conventional fastener (not shown). When attached to the frame 120, the tilting platform 110 can be disposed latitudinally between the rear wheels 130B and longitudinally between the front member 125 and the back member 124 of the frame 120 with the free end 115 of the tilting platform 110 extending beyond the back member 124 of the frame 120. The tilting platform 110 can be vertically between the axle 131 and the surface that the wheelchair accessible cycle 100 is on so that the tilting platform 110 is high enough to avoid objects on the surface, while remaining low enough that a gradual incline is created when the tilting platform 110 is in the tilted position. Positioning the tilting platform 110 below the axle 131 uses less space to load into and unload from the tilting platform 110 and also gives the operator the ability to safely unload from the tilting platform 110 in the horizontal position if the need so arises.

To assist with locking the tilting platform 110 in the horizontal position, the second pair of flanges 117 can be positioned on the side walls 112 adjacent to the front lip 113. A free end 108 of each flange 117 can have an arcuate configuration that extends away from the base 111 of the tilting platform 110. The free end 108 of each flange 117 can provide a knob 109 that extends substantially perpendicular from the flange 117 away from the front lip 113. The knob 109 can be configured so that the knob 109 can be secured in a recess 171 on a locking assembly 170 to lock the tilting platform 110 in the horizontal position.

Figure 5:
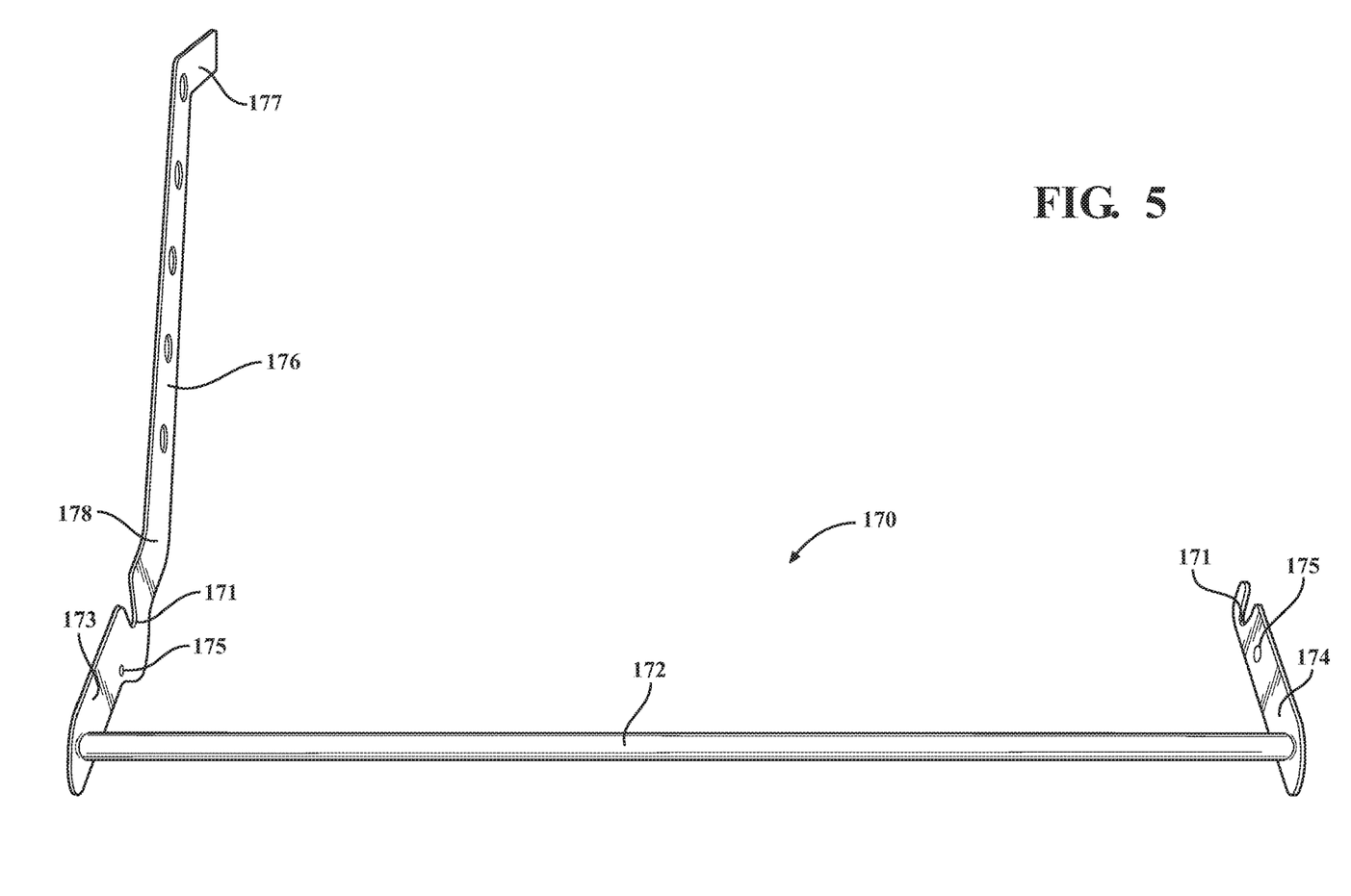
FIG. 5 is a perspective view of a locking assembly for the tilting platform.

As shown in FIG. 5, the locking assembly 170 can include a bar 172 with extensions 173, 174 on each end. With one exception to be described later in the description, the extensions 173, 174 can be substantially similar, extending perpendicular from the ends of the bar 172. Each extension 173, 174 can also have a recess 171 formed on an edge of the extensions 173, 174. The recesses 171 can extend in the same direction so that each recess 171 can receive one of the knobs 109 on the second pair of flanges 117. Between the recess 171 and the bar 172, an aperture 175 can extend through each extension 173, 174 in substantially the same location, which can be used to attach the locking assembly 170 to the bottom member 123 of the frame 120 between the mid-section member 127 and the rear wheels 130B through the use of a conventional fastener (not shown). Each of the apertures 175 can be approximately the same distance from the bar 172. The distance between each of the apertures 175 and the bar 172 can be defined so that the front lip 113 or the base 111 of the tilting platform 110 can rest on the bar 172 while allowing the base 111 of the tilting platform 110 to be substantially horizontal. A spring 179 can be attached to one or both of the extensions 173, 174 adjacent to the bar 172 to provide tension for the locking assembly 170 by biasing the locking assembly 170 into the locked position. In the illustrated, non-limiting example, the spring 179 is attached to the extensions 174 and the bottom member 123 of the frame 120 near the axle 131 of the rear wheel 130B on that side of the frame 120.

To allow the operator to secure the tilting platform 110 in the horizontal position, one or both of the extensions 173, 174 can include a cantilevered arm 176 with a handle 177 on a free end. In the illustrated, non-limiting example, the cantilevered arm 176 is integral with and extends from extension 173. An elbow 178 in the cantilevered arm 176 allows the cantilevered arm 176 to angle away from the extension 173. The elbow 178 provides a stop for the knob 109 when the tilting platform 110 is in a tilted position.

Figure 6:
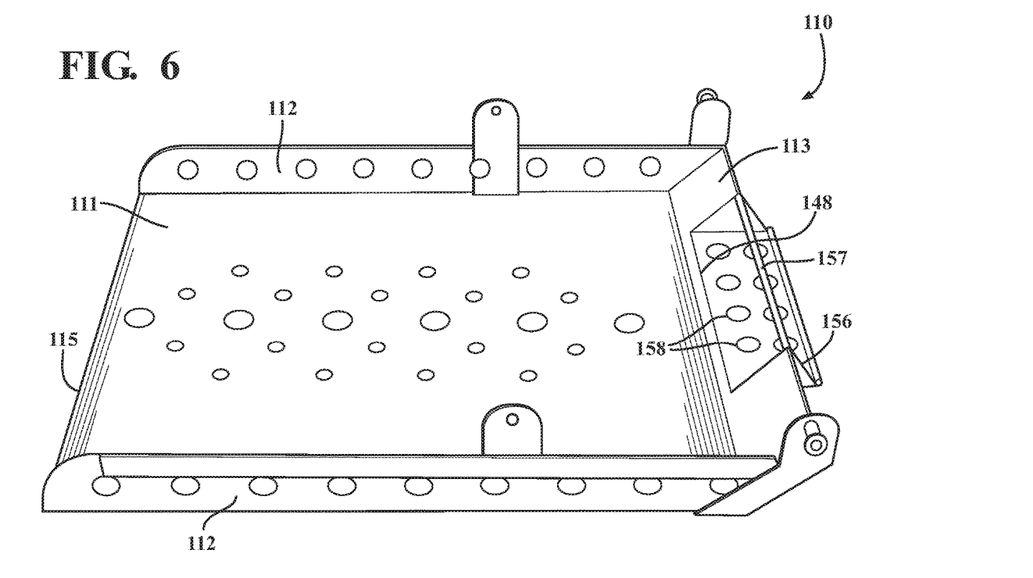
FIG. 6 is a perspective view of an alternative embodiment of the tilting platform.

An alternative embodiment of the tilting platform 110 is illustrated in FIG. 6 that is substantially similar as previously described except for the differences that will be described. To provide a footrest for the operator sitting in the wheelchair 99, a center region 148 of the front lip 113 of the tilting platform 110 can be provided with a flat extension 149 that defines one side of a recess 156. The flat extension 149 can be substantially parallel with the base 111 of the tilting platform 110 and be provided with apertures 158 that extend through the flat extension 149. The apertures 158 in the flat extension 149 can be similar to the apertures 114 formed in the side walls 112, the front lip 113, and/or the base 111 of the tilting platform 110.

Because the front lip 113 of the tilting platform 110 extends at the obtuse angle α from the base 111, the recess 156 can have a substantially triangular cross-sectional configuration. To assist with securing the operator's feet on the flat extension 149 and/or within the recess 156, a strap 157 can extend laterally across the recess 156. The strap 157 can be fabricated from any suitable material, such as nylon.

Figure 7:
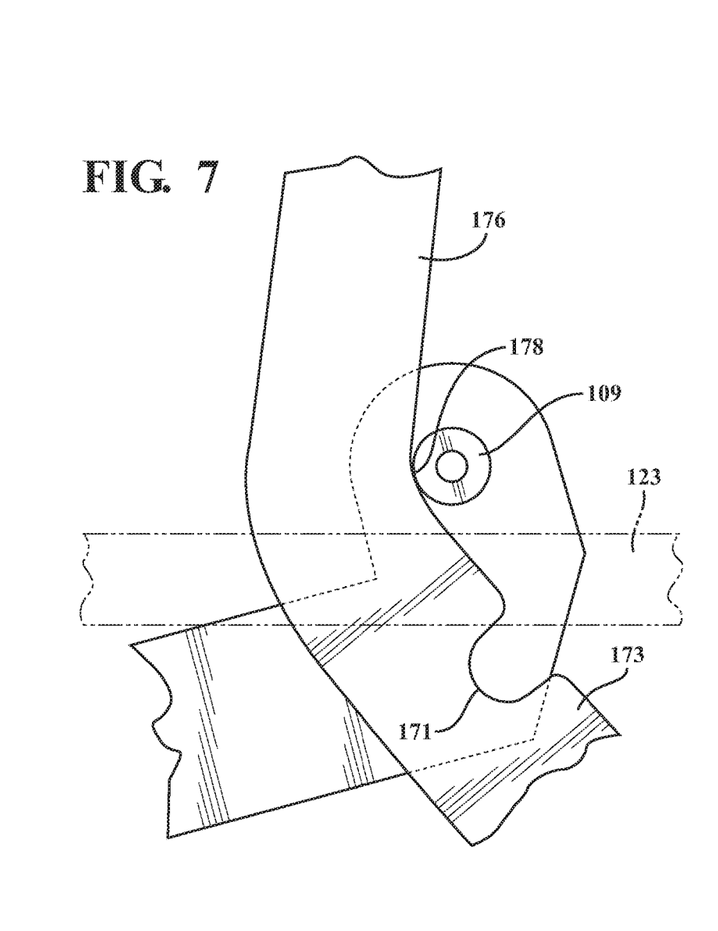
FIG. 7 is a schematic drawing of the locking assembly in an unlocked position.

To use the wheelchair accessible cycle 100, the operator first loads his or her wheelchair 99 onto the tilting platform 110. This can be accomplished by positioning the cantilevered arm 176 so that the locking assembly 170 is in the unlocked position shown in FIG. 7. When the locking assembly 170 is unlocked, the knobs 109 are disposed outside of the recesses 171, and the tilting platform 110 moves into the tilted position because of the location of the center of gravity of the tilting platform 110. In the tilted position, the free end 115 of the tilting platform 110 is in contact with the surface that the wheelchair accessible cycle 100 is on. The operator, with or without assistance, moves his or her wheelchair 99 onto the tilting platform 110 until the additional weight of the wheelchair 99 and the operator changes the center of gravity and moves the tilting platform 110 into the horizontal position, where the base 111 or the front lip 113 of the tilting platform rests on the bar 172 of the locking assembly 170. The operator can use the mid-section members 127 to help position the wheelchair 99 on the tilting platform 110.

Figure 8:
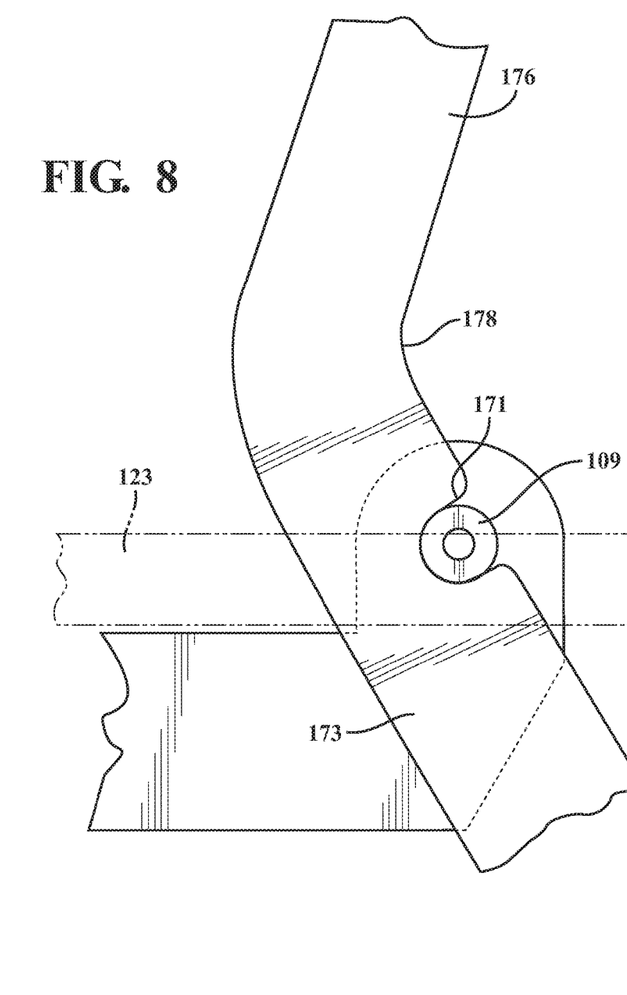
FIG. 8 is a schematic drawing of the locking assembly in a locked position.

Once in the horizontal position, the biasing force of the spring 179 moves the locking assembly 170 into the locked position, where the knobs 109 on the tilting platform 110 are restrained within the recesses 171 of the locking assembly 170, as illustrated in FIG. 8. In the horizontal position, the wheelchair 99 is adjacent to the handlebars 140, which allows the operator in the wheelchair 99 to operate the wheelchair accessible cycle 100 from his or her wheelchair 99. If the tilting platform 110 is provided with the flat extension 149 and the strap 157, the operator can position his or her feet and/or footrests of the wheelchair 99 within the recess 156 between the flat extension 149 and the strap 157. Doing such makes it less likely that the operator's feet will leave the wheelchair's footrest if the operator hits a large bump in the road while driving the wheelchair accessible cycle 100.

The wheelchair accessible cycle 100 is powered using the pedal powertrain 160, the electric powertrain 150, or both. The electric powertrain 150 can be activated using the controller 153 and the throttle 155, and the pedal powertrain 160 can be activated using the pedal cranks 161. When the electric powertrain 150 and the pedal powertrain 160 are used together, the electric powertrain 150 assists the pedal powertrain 160 and compensates for the power that the operator is unable to physically provide using the pedal cranks 161. The brake levers 141 can be used to activate the disc brakes 133 to slow or stop the wheelchair accessible cycle 100 as necessary.

To exit the wheelchair accessible cycle 100 when it is stationary, the operator moves the cantilevered arm 176 via the handle 177 to disengage the knobs 109 of the tilting platform 110 from the recesses 171, thereby unlocking the locking assembly 170. The operator, with or without assistance, can then roll the wheelchair 99 backwards toward the free end 115 of the tilting platform 110. Eventually the center of gravity will change so that the tilting platform 110 moves to the tilted position, where the operator can safely and quickly exit the wheelchair accessible cycle 100.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wheelchair accessible cycle to be driven on a surface and operable from a wheelchair, the wheelchair accessible cycle comprising:
   a frame having a front portion with a first wheel and a rear portion with second and third wheels; and
   a platform disposed laterally between the second and third wheels and longitudinally between the front and rear portions of the frame, wherein a front portion of the platform is disposed longitudinally between the first and second wheels, and wherein the platform is configurable to transport the wheelchair on a wheelchair supporting surface when the wheelchair is adjacent to the front portion of the frame,
   wherein the wheelchair supporting surface and the front portion of the platform are pivotally moveable between a tilted position, where the wheelchair supporting surface and the front portion of the platform are inclined and a free edge of the platform is in contact with the surface for rollably receiving the wheelchair, and a horizontal position, where the wheelchair supporting surface and the front portion of the platform are generally horizontal.

2. The wheelchair accessible cycle of claim 1, wherein the platform is vertically disposed between the surface and an axle of at least one of the second wheel or the third wheel.

3. The wheelchair accessible cycle of claim 1, wherein the free edge of the rear portion of the platform extends longitudinally a distance beyond the rear portion of the frame in both the tilted position and the horizontal position.

4. The wheelchair accessible cycle of claim 1, wherein the platform further comprises two flanges having first ends pivotally connected to the frame and second ends fixedly connected to the platform.

5. The wheelchair accessible cycle of claim 1 further comprising:
   a locking assembly connected to the frame and the platform, wherein the locking assembly moves between a locked position, where the platform is retained in the horizontal position, and an unlocked position, where the platform can move between the tilted position and the horizontal position.

6. The wheelchair accessible cycle of claim 1, wherein the frame further comprises a first framed enclosure extending vertically around the second wheel substantially perpendicular to an axle of the second wheel and a second framed enclosure extending vertically around the third wheel substantially perpendicular to an axle of the third wheel.

7. The wheelchair accessible cycle of claim 1, wherein the platform further comprises a base and a front lip extending at an obtuse angle from the base, the front lip having a flat extension that is substantially parallel to the base of the platform.

8. The wheelchair accessible cycle of claim 1, further comprising:
   at least one of a pedal powertrain or an electric powertrain operably connected to at least one of the first wheel, the second wheel, or the third wheel.

9. The wheelchair accessible cycle of claim 1, further comprising:
   a steering mechanism operably connected to at least one of the first wheel, the second wheel, or the third wheel.

10. A wheelchair accessible cycle to be driven on a surface and operable from a wheelchair, the wheelchair accessible cycle comprising:
    a frame having a front portion with a first wheel and a rear portion with second and third wheels;
    a platform disposed laterally between the second and third wheels and longitudinally between the front and rear portions of the frame, wherein the platform is configurable to transport the wheelchair and is pivotally moveable between a tilted position, where a free edge of the platform is in contact with the surface for rollably receiving the wheelchair, and a horizontal position, where the platform is generally horizontal, and the wheelchair is adjacent to the front portion of the frame when the wheelchair is loaded onto the platform; and
    a locking assembly having a spring connected to the platform and the frame that biases the locking assembly into a locked position, wherein the locking assembly moves between the locked position, where the platform is retained in the horizontal position, and an unlocked position, where the platform can move between the tilted position and the horizontal position.

11. A wheelchair accessible cycle to be driven on a surface and operable from a wheelchair, the wheelchair accessible cycle comprising:
    a frame having a front portion with a first wheel and a rear portion with second and third wheels;
    a platform disposed laterally between the second and third wheels and longitudinally between the front and rear portions of the frame, wherein the platform is configurable to transport the wheelchair and is pivotally movable between a tilted position, where a free edge of the platform is in contact with the surface for rollably receiving the wheelchair, and a horizontal position, where the platform is generally horizontal; and a locking assembly connected to the frame and the platform and having a laterally extending bar for engaging the platform in the horizontal position, wherein the locking assembly moves between a locked position, where the platform is retained in the horizontal position, and an unlocked position, where the platform can move between the tilted position and the horizontal position.

12. The wheelchair accessible cycle of claim 11, wherein ends of the laterally extending bar are provided with extensions that extend substantially perpendicular from the laterally extending bar and connect the laterally extending bar to the frame, wherein at least one of the extensions provides a recess.

13. The wheelchair accessible cycle of claim 12, wherein the platform further comprises a flange with a knob, wherein the knob engages the recess to retain the platform in the horizontal position.

14. The wheelchair accessible cycle of claim 12, wherein the locking assembly further comprises a handle connected to at least one of the extensions of the laterally extending bar.

15. The wheelchair accessible cycle of claim 11, wherein the platform further comprises a front lip extending from the wheelchair supporting surface longitudinally opposite the free edge of the platform, the front lip of the platform engages the laterally extending bar of the locking assembly in the horizontal position.

16. A wheelchair accessible cycle to be driven on a surface and operable from a wheelchair, the wheelchair accessible cycle comprising:
a frame having a front portion with a first wheel and a rear portion with second and third wheels; and
a platform disposed laterally between the second and the third wheels and longitudinally between the front and rear portions of the frame,
wherein the platform is configurable to transport the wheelchair, and the wheelchair is adjacent to the front portion of the frame when the wheelchair is loaded onto the platform,
wherein the platform has a base, a first side wall extending substantially perpendicular from the base, a second side wall laterally opposite and substantially parallel to the first side wall, a first flange extending upward from the first side wall between a free edge and a second end of the platform longitudinally opposite the free edge and a second flange extending upward from the second side wall between the free edge and the second end of the platform,
wherein the platform is pivotally moveable between a tilted position, where the free edge of the platform is in contact with the surface for rollably receiving the wheelchair, and a horizontal position, where the platform is generally horizontal, and
wherein the first flange and the second flange pivotally connect the platform to the frame.

17. The wheelchair accessible cycle of claim 16, wherein the first flange and the second flange of the platform are substantially a same longitudinal distance from the second end of the platform.

18. The wheelchair accessible cycle of claim 17, wherein the first flange and the second flange of the platform are closer to the second end of the platform than the free edge of the platform.

19. The wheelchair accessible cycle of claim 16, wherein at least one of the first side wall, the second side wall, or the base is provided with apertures extending therethrough.

20. A wheelchair accessible cycle to be driven on a surface and operable from a wheelchair, the wheelchair accessible cycle comprising:
a frame having a front portion with a first wheel and a rear portion with second and third wheels;
a platform having a base and a front lip extending at an obtuse angle from the base, the front lip having an flat extension that is substantially parallel to the base of the platform, wherein the platform is disposed laterally between the second and third wheels and longitudinally between the front and rear portions of the frame, wherein the platform is configurable to transport the wheelchair and is pivotally moveable between a tilted position, where a free edge of the platform is in contact with the surface for rollably receiving the wheelchair, and a horizontal position, where the platform is generally horizontal, and wherein the wheelchair is adjacent to the front portion of the frame when the wheelchair is loaded onto the platform; and
a strap is attached to the front lip of the platform and extends laterally over a recess defined on one side by the flat extension.

21. A wheelchair accessible cycle to be driven on a surface and operable from a wheelchair, the wheelchair accessible cycle comprising:
a frame having a front portion with a first wheel and a rear portion with second and third wheels; and
a platform disposed laterally between the second and third wheels and longitudinally between the front and rear portions of the frame, wherein the platform is pivotally movable between a tilted position, where a free edge of the platform is in contact with the surface for rollably receiving the wheelchair, and a horizontal position, where the platform is generally horizontal,
wherein a change in a center of gravity moves the platform between the horizontal and tilted positions as the wheelchair is loaded onto or unloaded from the platform.

* * * * *